United States Patent
Frost et al.

(10) Patent No.: US 7,508,843 B2
(45) Date of Patent: Mar. 24, 2009

(54) METHOD AND APPARATUS FOR DISTRIBUTING TIMING DATA ACROSS A PACKET NETWORK

(75) Inventors: Timothy Michael Edmund Frost, Plymouth (GB); Geoffrey Edward Floyd, Devon (GB)

(73) Assignee: Zarlink Semiconductor Limited, Wiltshire (GB)

( * ) Notice: Subject to any disclaimer, the term of this patent is extended or adjusted under 35 U.S.C. 154(b) by 865 days.

(21) Appl. No.: 10/643,129

(22) Filed: Aug. 18, 2003

(65) Prior Publication Data

US 2004/0160989 A1 Aug. 19, 2004

(30) Foreign Application Priority Data

Aug. 21, 2002 (GB) ................................. 0219456.1

(51) Int. Cl.
*H04J 3/06* (2006.01)
(52) U.S. Cl. ....................... 370/503; 370/350
(58) Field of Classification Search ................ 370/503, 370/504, 508, 509, 510, 512, 514, 516
See application file for complete search history.

(56) References Cited

U.S. PATENT DOCUMENTS

| | | | | |
|---|---|---|---|---|
| 6,208,665 | B1 * | 3/2001 | Loukianov et al. | 370/486 |
| 6,339,584 | B1 * | 1/2002 | Gross et al. | 370/225 |
| 6,975,618 | B1 * | 12/2005 | Smith et al. | 370/350 |
| 7,042,914 | B2 * | 5/2006 | Zerbe et al. | 370/516 |
| 7,339,956 | B2 * | 3/2008 | Rabenko et al. | 370/503 |
| 7,366,754 | B2 * | 4/2008 | Wetzel et al. | 709/203 |
| 2002/0136232 | A1 * | 9/2002 | Dudziak et al. | 370/445 |
| 2002/0169993 | A1 * | 11/2002 | Woods et al. | 713/400 |
| 2002/0196801 | A1 * | 12/2002 | Haran et al. | 370/432 |
| 2003/0020991 | A1 * | 1/2003 | Chang | 359/168 |
| 2003/0056136 | A1 | 3/2003 | Aweya et al. | |
| 2004/0090994 | A1 * | 5/2004 | Lockridge et al. | 370/509 |

FOREIGN PATENT DOCUMENTS

| | | |
|---|---|---|
| EP | 0 722 233 A2 | 12/1995 |
| EP | 0 722 233 A3 | 12/1995 |
| GB | 2 340 356 | 2/2000 |
| WO | 00/19649 | 4/2000 |
| WO | 02/075969 | 9/2002 |

OTHER PUBLICATIONS

Search Report regarding corresponding Great Britain Application No. 0219456.1 dated Jan. 21, 2003.

* cited by examiner

*Primary Examiner*—Chi H. Pham
*Assistant Examiner*—Kevin Mew
(74) *Attorney, Agent, or Firm*—Renner, Otto, Boisselle, & Sklar LLP

(57) ABSTRACT

A method for distributing timing information across a packet network includes generating timing signals at a master clock at predictable intervals using a clock reference of a given frequency. The timing signals are broadcast or multicast to a plurality of slave clocks over the packet network, preserving the timing signal intervals. At each slave clock, the intervals between successively received timing signals are determined. A clock recovery algorithm is applied to the determined intervals to recover in substantially real time the original clock frequency. The local clock frequency of the slave clock is synchronized to the recovered frequency.

10 Claims, 4 Drawing Sheets

METHOD AND APPARATUS FOR DISTRIBUTING TIMING DATA ACROSS A PACKET NETWORK

FIELD OF THE INVENTION

The present invention relates to a method and apparatus for distributing timing data across a packet network such as an Ethernet, an ATM network or an IP network.

BACKGROUND TO THE INVENTION

Within telecommunications systems, data has traditionally been distributed using Time Division Multiplexing (TDM). This is true for both trunk links, e.g. connecting exchanges, and within network nodes such as gateway nodes interconnecting networks. In a TDM system operating at a given Bode rate, a number of channels are defined by allocating specific slots within successive time frames to given channels.

FIG. 1 illustrates the structure of an exemplary gateway of a telecommunications system (the gateway may be entirely contained with a single rack, or may be geographically distributed). Four line-input cards 1a-1d receive data from a set of conventional telecommunication links, e.g. T1 or E1, whilst an uplink card 2 is coupled to a further conventional telecommunication link operating at a higher data rate, e.g. a T3, E3, SONET or SDH link. The gateway also contains a number of central resource "pools", i.e. a modem pool 3, remote access concentrators 4, and Voice over IP (VoIP) codecs 5. Other pools such as an echo cancellation pool may be provided. Data is distributed between the line cards 1, the uplink card 2, and the resource pools 3 to 5 via a TDM backplane 6 (e.g. H.110). A typical TDM backplane may provide 4096 channels, each of which can carry data corresponding to a telephone call.

In a TDM system, it is critical that components are able to operate in synchrony with one another. Components must be able to place data on, and take data off, the TDM backplane at the correct points in time. The TDM backplane therefore carries a common clock signal, driven from an appropriate reference clock. All TDM components synchronise to this common clock line. In FIG. 1, the reference clock signal is received by the uplink card 2, and is placed on a common clock line (which in the Figure is shown integrated into the TDM backplane 6).

TDM based systems have a number of disadvantages. In particular, such systems do not scale well to high channel counts as higher channel counts require a proportionately higher clock frequency. Also, in order to retrieve the correct data from the backplane, the phase of the clock signal must be matched at each point along the backplane. Therefore it is not straightforward to couple multiple racks together given tight phase constraint and high frequency requirements on the common system clock line. For these reasons, operators and equipment manufacturers are moving to packet-based backplane systems in which the TDM backplane is replaced by a packet network backplane. This is illustrated in FIG. 2, with the packet backplane being indicated by the reference numeral 7. An example of a suitable packet backplane 7 is an Ethernet-based backplane. Such a system has a number of advantages. In particular, the system is easily scalable as the backplane can be extended between system elements with a simple Unshielded Twisted Pair (UTP) cable, and there is no limit placed on channel count. In addition, network hardware for packet networks is relatively cheap and readily available, as compared to TDM hardware.

As with systems using a TDM backplane, within a packet backplane it is necessary to synchronise the clocks of components coupled to the backplane. A consequence of any long-term mismatch in the clock frequencies of components is that the packet queues within individual cards will fill up or empty depending on whether the receiving component clock is running slower or faster than the transmitting component clock. This results in the loss of data and degradation of the service. However, the advantage of a packet backplane over a TDM backplane is that with the former it is only the mean frequency that must be matched, not the phase of the clock.

One solution to the synchronisation problem is that used in TDM backplane based systems, i.e. connecting all components to a common clock line. However, it is desirable to be able to move towards a system in which all components are interconnected only via a packet network, and to avoid the need to connect components to a common clock line. This is particularly so in large systems or in systems where the system components are not contained within a single rack and are perhaps spread over a relatively wide area.

Mechanisms for synchronising computers coupled to a network, e.g. the Internet, are known. For example, the Network Time Protocol (NTP) provides a means for synchronising computers to a common time reference and involves the sending of time "stamps" from network servers to client computers. Round trip times are measured between servers in order to determine the time offsets between servers. NTP can provide control of a clock to within a few milliseconds. This is not sufficient for a low latency packet backplane.

It is an object of the present invention to provide a mechanism for synchronising clocks over a packet network. This object is achieved by broadcasting or multicasting timing signals from a master clock, over the packet network, to other slave clocks.

SUMMARY OF THE INVENTION

According to a first aspect of the present invention there is provided a method of distributing timing information across a packet network, the method comprising:

at a master component, generating timing signals at predictable intervals using a clock reference of a given frequency, and broadcasting or multicasting the timing signals to a plurality of client components over said packet network, preserving the timing signal intervals; and at each said client component, receiving said timing signals and determining the intervals between successive signals, applying a clock recovery algorithm to said determined intervals to recover in substantially real time the original clock frequency, and synchronising the frequency of a local clock of the client component to the recovered frequency.

In certain embodiments of the present invention, the method is used to distribute timing information between various components of a telecommunication system coupled together via a packet network. These components may include one or more components coupled to TDM networks/links. More particularly, one or more of the components may be coupled to a T1 or E1 link or to a T3 or E3 link, performing a data conversion function between the T1, E1, T3 or E3 data format and the packet network data format. Alternatively, one of the components may be coupled to a SONET or SDH link.

In certain embodiments of the present invention, the packet network forms a backplane of a telecommunications gateway.

The packet network may be an Ethernet network. Alternatively, the packet network may be an IP network or an AAL network.

Preferably, a packet for transmission over the packet network and which contains a timing signal, also contains a priority marker. Routing nodes in the network relay such packets with the highest possible priority. This reduces perturbations in packet arrival time due to network delay fluctuations.

According to a second aspect of the present invention there is provided apparatus for enabling the operating clock frequencies of a plurality of components, coupled to a packet network, to be synchronised to the clock frequency of a master component also coupled to the packet network, the apparatus comprising:

means at the master component for receiving or generating a clock signal having a clock frequency, and for generating from said clock signal, timing signals at predictable intervals;

means at the master component for broadcasting or multicasting the timing signals to a plurality of client components over said packet network, preserving the timing signal intervals; and means at each said client component for receiving said timing signals and determining the intervals between successive signals, for applying a clock recovery algorithm to said determined intervals to recover in substantially real time the original clock frequency, and for synchronising the local clock frequency of the client component to the recovered clock frequency.

According to a third aspect of the present invention there is provided a gateway of a telecommunications network, the gateway comprising:

a plurality of components each operating at a local clock frequency, one of the components, the master component, generating or receiving a reference clock signal having a given frequency; and a packet network backplane for communicating packet data between said components, the master component having means for generating from said clock reference a stream of timing signals at predictable intervals, and means for broadcasting or multicasting said timing signals, preserving the timing signal intervals, to other components operating at said local clock frequencies via said packet network backplane, and the receiving components having means for synchronising their local clock frequencies to said reference clock frequency by analysing the intervals between received timing signals.

In certain embodiments of the present invention, at least one of said components is a TDM line card, coupled in use to a TDM link, e.g. a T1, E1, T3 or E3 link. More particularly, at least one of the components may be a TDM line card coupled to a T1 or E1 link whilst at least one other component is a TDM line card coupled to a T3 or E3 link, the gateway performing up and down conversions for data received and sent via the links.

DETAILED DESCRIPTION OF CERTAIN EMBODIMENTS

Figure 1:
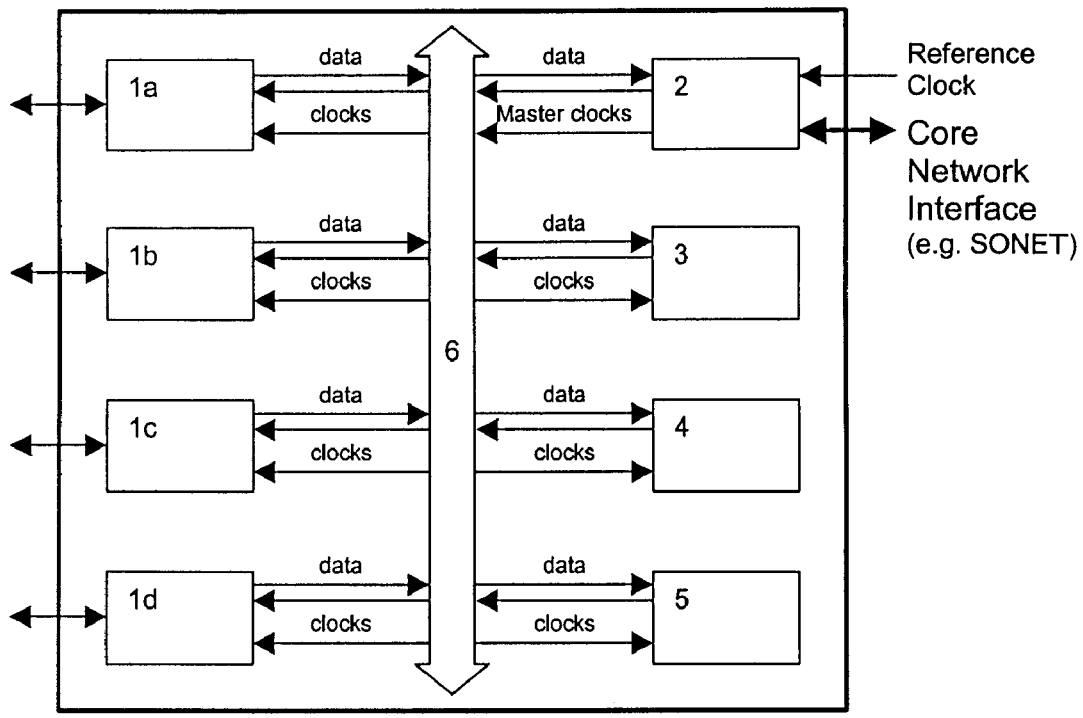
FIG. 1 illustrates schematically a telecommunications gateway comprising a TDM backplane.
Figure 2:
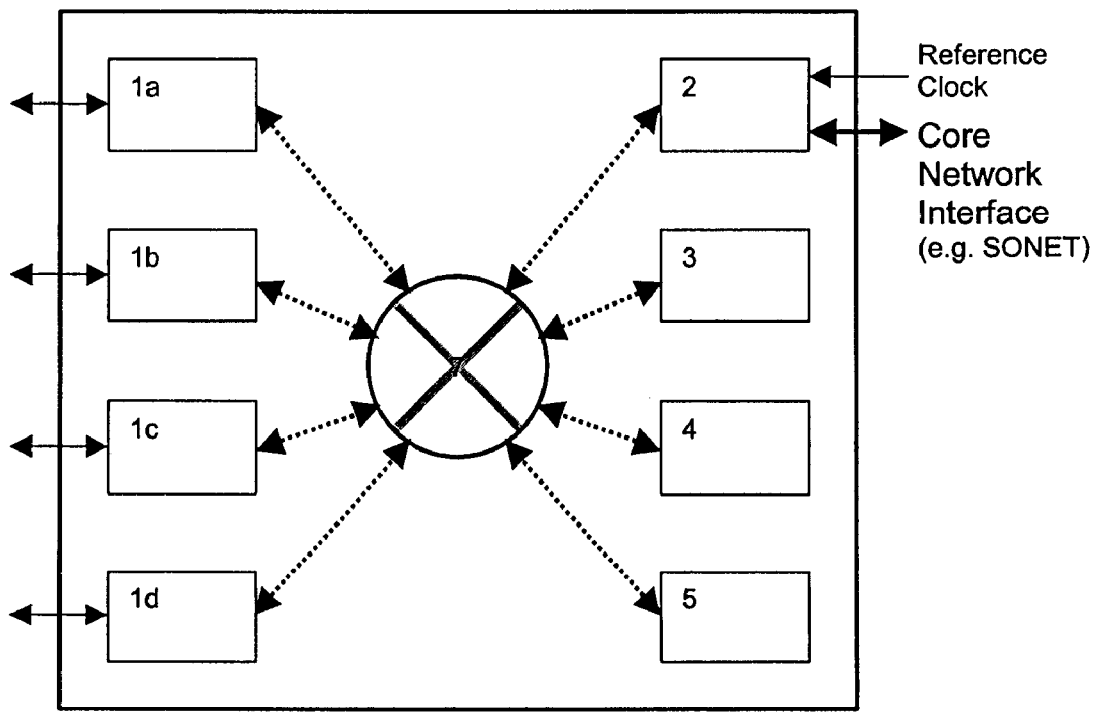
FIG. 2 illustrates schematically a telecommunications gateway comprising a packet backplane.

A conventional telecommunications gateway has been described with reference to FIG. 1. With reference to FIG. 2, a new-style gateway will be described which makes use of a packet backplane. A mechanism for distributing timing information to various gateway nodes, via a packet backplane, will now be described.

Figure 3:
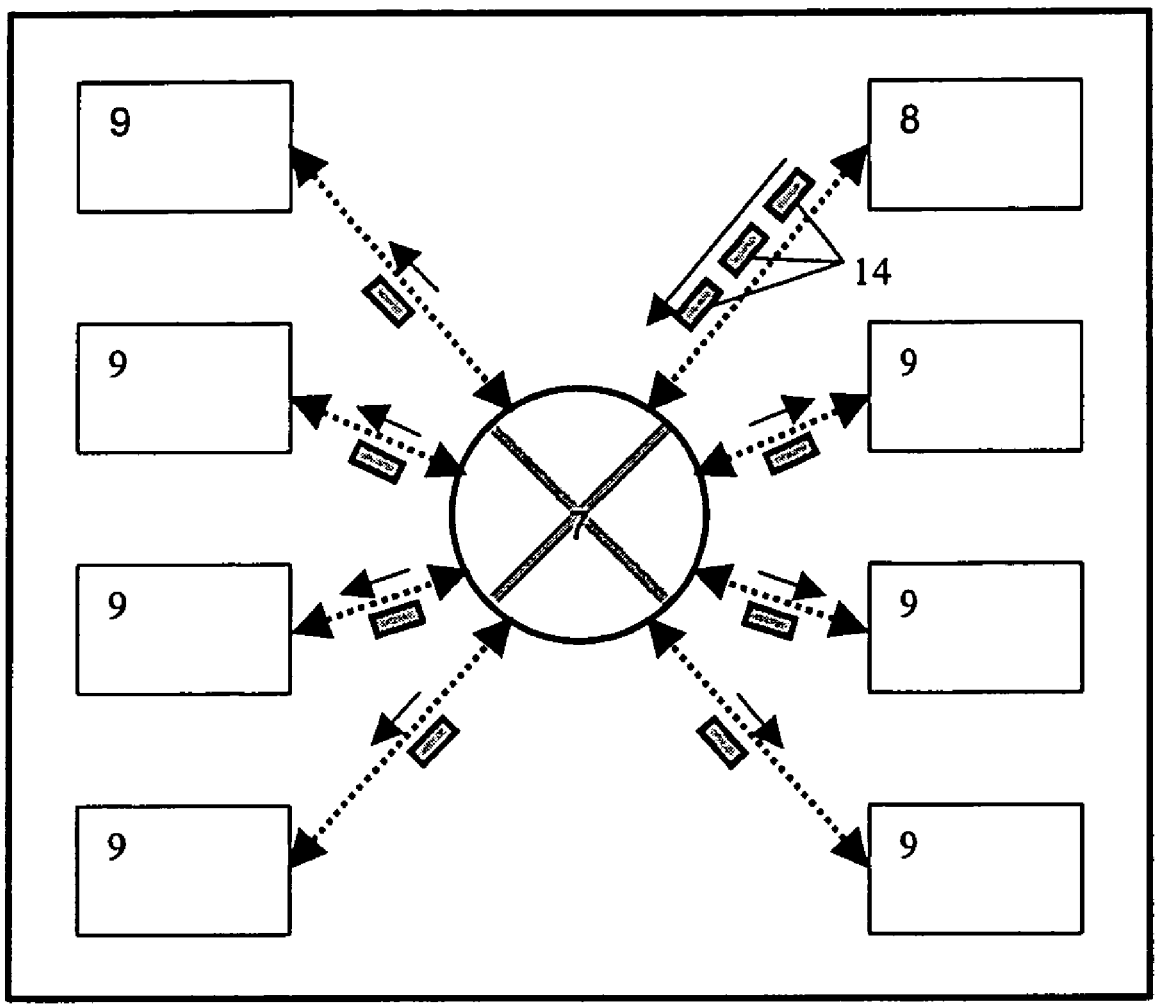
FIG. 3 illustrates schematically a telecommunications gateway comprising a packet backplane and in which clock frequencies of clock slaves are synchronised to the clock frequency of a clock master.

FIG. 3 illustrates the telecommunications gateway of FIG. 2, and in which the packet backplane is an Ethernet backplane. To simplify the explanation of the proposed mechanism, only the "local" clocks of the various components need be considered and these are illustrated in FIG. 3. One of the clocks 8 is designated as the master clock, whilst the other clocks 9 can be considered slave clocks.

Figure 4:
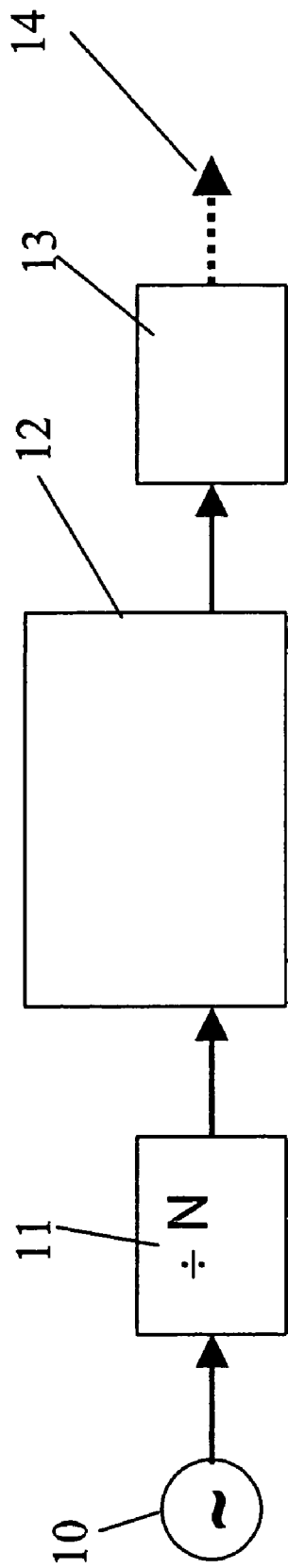
FIG. 4 illustrates schematically a timing signal generator of the clock master of the gateway of FIG. 3.

FIG. 4 illustrates in more detail the structure of the master clock 8. This clock makes use of a master reference oscillator 10 which supplies clock signals to a counter 11 at a frequency $f_m$. Whilst the reference oscillator 10 illustrated in FIG. 4 is integrated into the master clock 8, the oscillator may be external to the master clock 8, or indeed a reference clock signal may be derived from an external source such as the external TDM link. The exact source of the oscillator signal is not critical. The counter 11 divides the clock frequency by an integer N and supplies the resulting low frequency signal (consisting of a sequence of "ticks" at a frequency $f_m/N$) to a control input of a CPU 12. The CPU 12 functions according to an operating program to generate a timing packet for each tick received at the control input. The upper layer transmission protocols may be TCP/IP or some other suitable protocol(s). The packets are marked as broadcast packets by including a special flag in the packet header such that every node coupled to the packet network is a destination node for the packet (alternatively packets may be marked as multicast packets).

Figure 5:
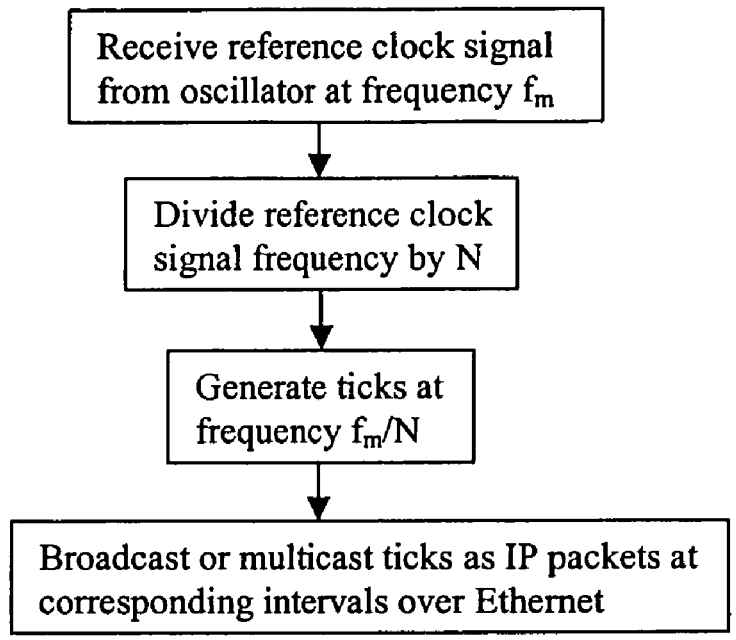
FIG. 5 is a flow diagram illustrating the operation of the timing signal generator of FIG. 4.

The generated timing packets are passed to a network physical device 13 (in this case an Ethernet device) at intervals corresponding to the original tick intervals. This device 13 causes the packets 14 to be sent out on the packet backplane, where they are routed to their destinations by intermediate packet switches/routers. The operation of the master clock 8 is further illustrated in the flow diagram of FIG. 5.

It will be appreciated that the transmission delay over a packet backplane such as an Ethernet backplane is unpredictable. Thus, whilst packets are sent from the master clock at regular intervals (with a frequency of $f_m/N$), they are unlikely to be received at a slave clock with the same, constant frequency due to the variable transmission delay. Rather, some "jitter" will be introduced into the reception frequency. This jitter can be minimised by marking the timing packets as high priority packets. When a router recognises such a packet, it relays the packet with the highest possible priority. This will not however completely eliminate jitter. Further processing is required at the slave clocks.

Figure 6:
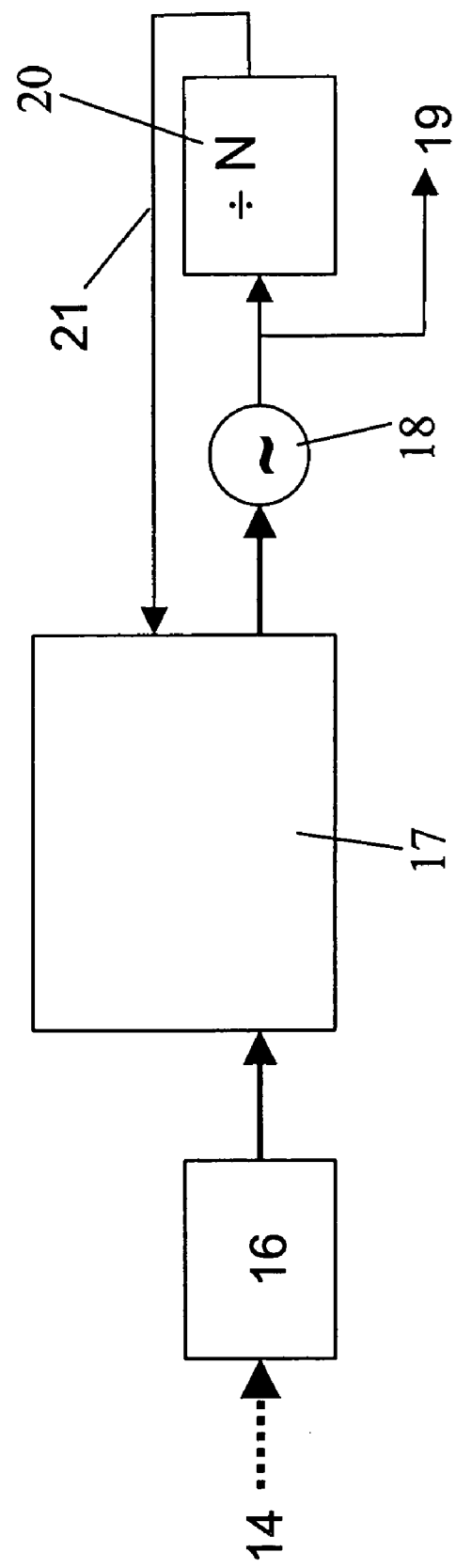
FIG. 6 illustrates schematically a slave clock controller of a slave clock of the gateway of FIG. 3.
Figure 7:
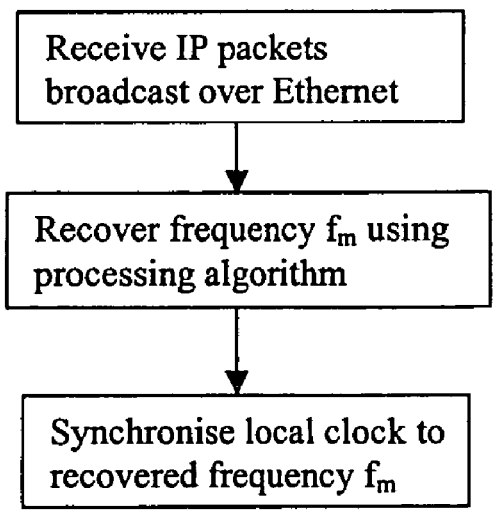
FIG. 7 is a flow diagram illustrating the operation of the controller of FIG. 6.

The structure of a slave clock 9 is illustrated schematically in FIG. 6. Timing packets 14 received at a slave clock 9 are passed by the network physical device 16 of the slave node to a CPU 17. The CPU 17 functions according to appropriate software instructions to recover the arrival rate of timing packets received over the backplane 7. Based on this rate, the CPU 17 generates a recovered estimated master clock frequency $f_{m'}$. The CPU employs an appropriate algorithm to smooth out variations in the recovered frequency. For example, an adaptive algorithm may be used. The recovered frequency is supplied to a control output of the CPU 17 (e.g. in the form of a time varying control voltage linearly related to frequency or as a time varying digital control word), from where it is passed to a voltage or numerically controlled oscillator 18. The oscillator 18 generates a clock signal 19 at the recovered frequency. This is then supplied to the clock inputs of the various elements of the gateway component which require clocking. The clock signal is also supplied to a counter 20 which divides the clock signal frequency by N, and passes the resulting low frequency tick 21 to a control input of the CPU 18. The CPU 18 uses this feedback signal to determine whether or not the signal applied to the numerically controlled oscillator 18 should be adjusted to achieve the desired clock frequency in the signal output by the oscillator 18. The operation of a slave clock 9 is further illustrated in the flow diagram of FIG. 7.

It will be appreciated by the person of skill in the art that various modifications may be made to the above described embodiments without departing from the scope of the present invention.

The invention claimed is:

1. A method of distributing timing information across a packet network, the method comprising:
   at a master component, generating timing signal packets containing timing signals at predictable intervals using a clock reference of a given frequency, and broadcasting or multicasting the timing signal packets to a plurality of client components over said packet network, preserving the timing signal packet intervals; and
   at each said client component, receiving said timing signal packets and determining the intervals between successive packets, applying a clock recovery algorithm to said determined intervals to recover in substantially real time the original clock frequency, and synchronizing the frequency of a local clock of the client component to the recovered frequency.

2. A method according to claim 1, the method being used to distribute timing information between various components of a telecommunication system coupled together via a packet network.

3. A method according to claim 2, wherein said components include one or more components coupled to TDM networks/links.

4. A method according to claim 1, wherein one or more of the components is coupled to a T1 or E1, T3 or E3, SONET or SDH link, performing a data conversion function between the T1 or E1, T3 or E3, SONET or SDH data format and the packet network data format.

5. A method according to claim 1, the packet network providing a backplane of a telecommunications gateway.

6. A method according to claim 1 and comprising including in said packets, a priority marker, and upon recognition of such packets at routers/switches of the packet network, forwarding them with the highest possible priority.

7. An apparatus for enabling the operating clock frequencies of a plurality of components, coupled to a packet network, to be synchronized to the clock frequency of a master component also coupled to the packet network, the apparatus comprising:
   means at the master component for receiving or generating a clock signal having a clock frequency, and for generating from said clock signal, timing signal packets containing timing signals at predictable intervals;
   means at the master component for broadcasting or multicasting the timing signal packets to a plurality of client components over said packet network, preserving the timing signal intervals; and
   means at each said client component for receiving said timing signal packets and determining the intervals between successive packets, for applying a clock recovery algorithm to said determined intervals to recover in substantially real time the original clock frequency, and for synchronizing the local clock frequency of the client component to the recovered clock frequency.

8. A gateway of a telecommunications network, the gateway comprising:
   a plurality of components each operating at a local clock frequency, one of the components, the master component, generating or receiving a reference clock signal having a given frequency; and
   a packet network backplane for communicating packet data between said components,
   the master component having means for generating from said clock reference a stream of timing signal packets containing timing signals at predictable intervals, and means for broadcasting or multicasting said timing signal packets, preserving the timing signal packet intervals, to other components operating at said local clock frequencies via said packet network backplane, and the receiving components having means for synchronizing their local clock frequencies to said reference clock frequency by analyzing the intervals between received timing signal packets.

9. A gateway according to claim 8, wherein at least one of said components is a TDM line card, coupled in use to a TDM link.

10. A gateway according to claim 9, wherein at least one of the components is be a TDM line card coupled to a T1 or E1 link whilst at least one other component is a TDM line card coupled to a T3, E3, SONET or SDH link, the gateway performing up and down conversions for data received and sent via the links.

* * * * *